INVENTOR.
HERBERT J. WANDERER
BY Robert W. Beart
ATTORNEY

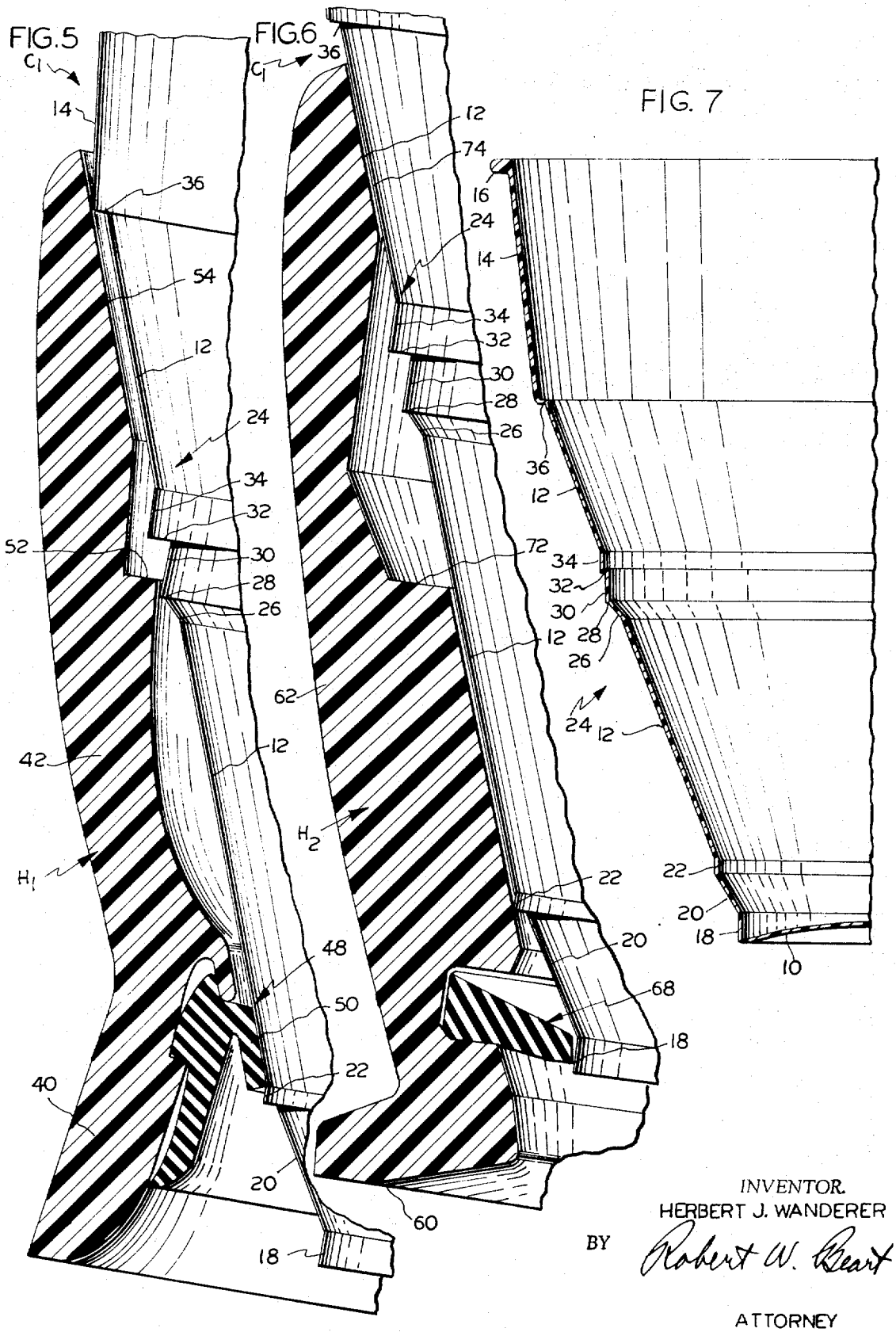
INVENTOR.
HERBERT J. WANDERER
BY Robert W. Beart
ATTORNEY

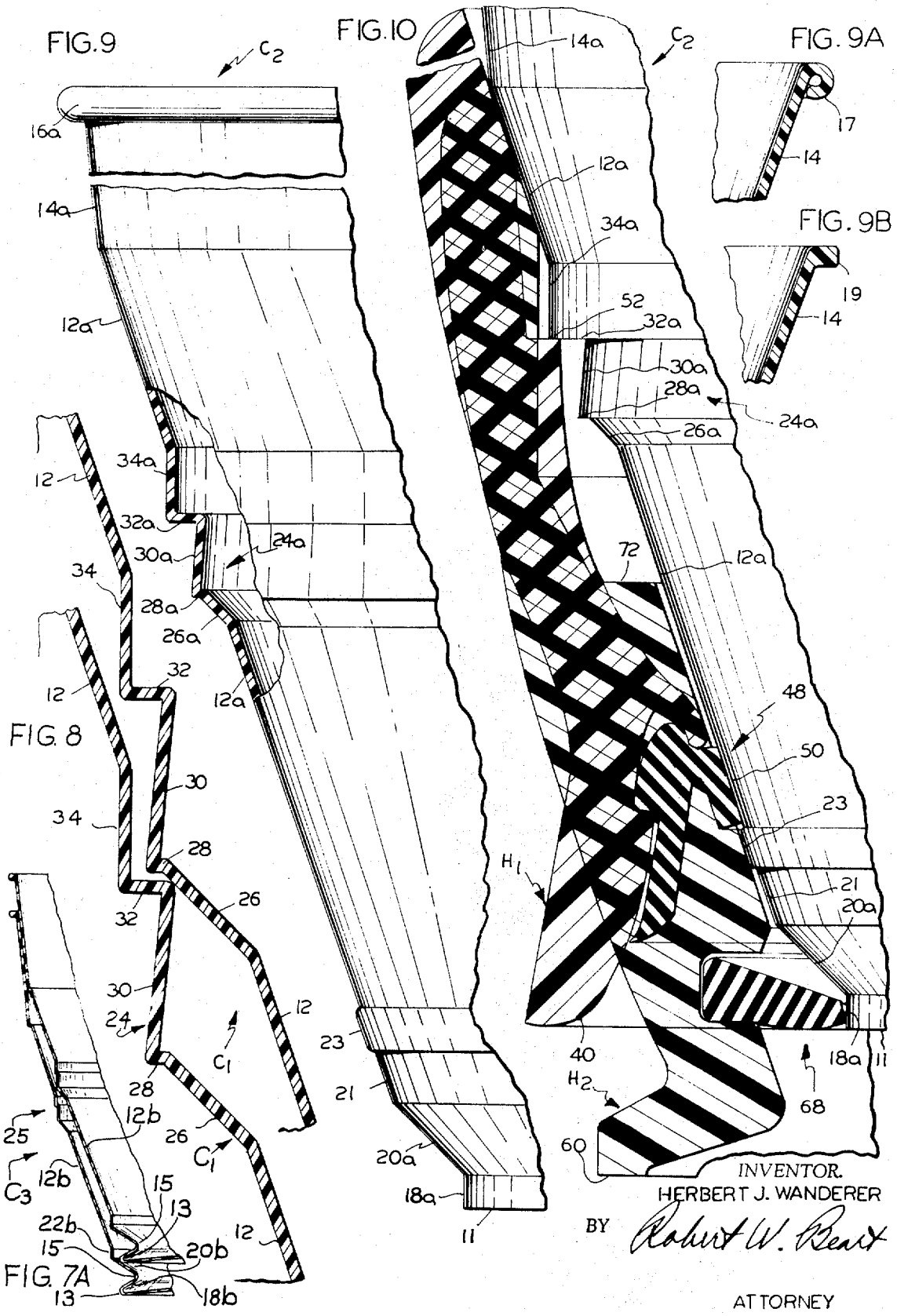
INVENTOR.
HERBERT J. WANDERER
BY Robert W. Beart
ATTORNEY

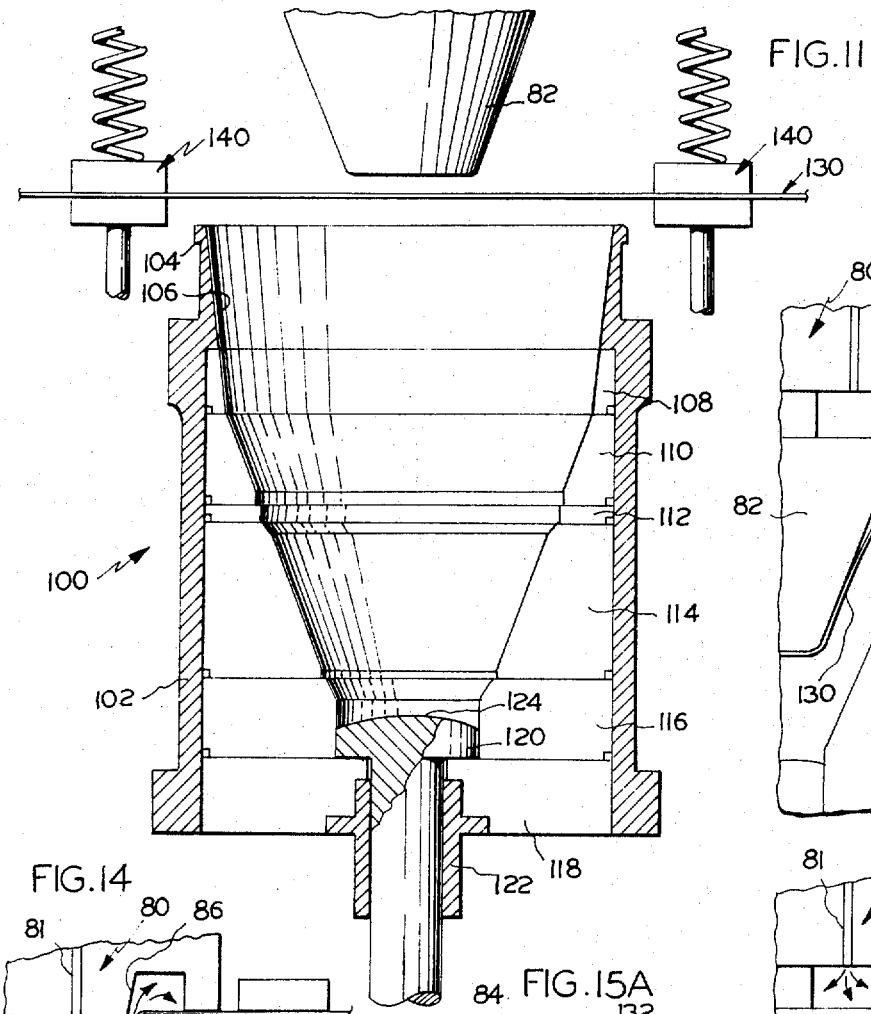
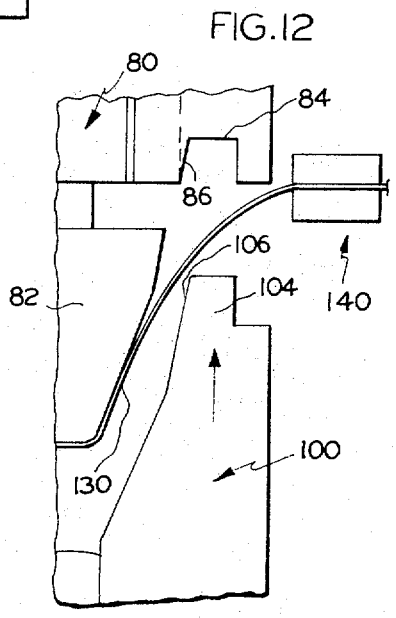
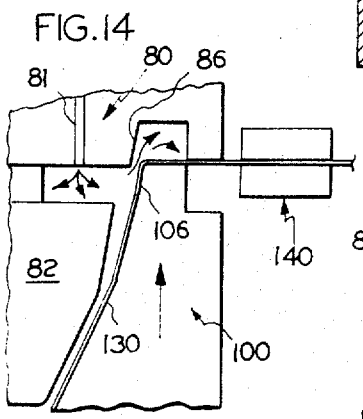
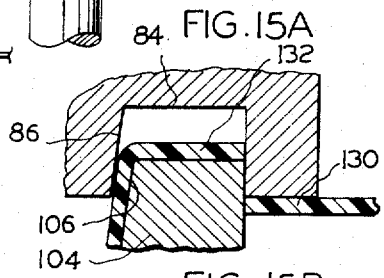
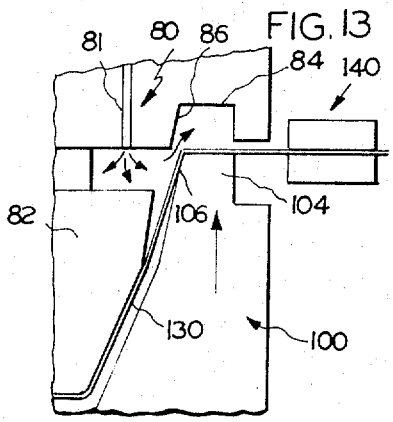
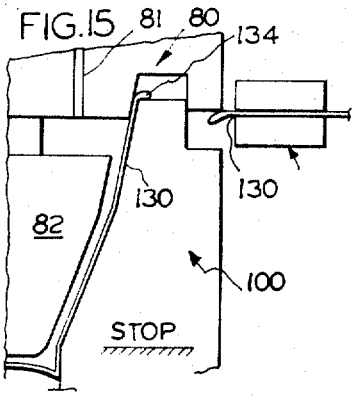
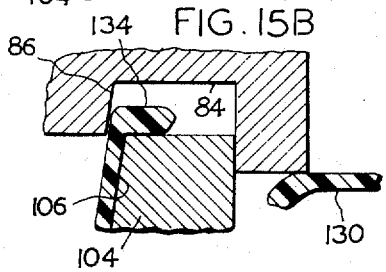
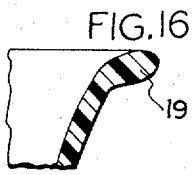
INVENTOR.
HERBERT J. WANDERER
BY Robert W. Read
ATTORNEY United States Patent Office Re. 27,409
Reissued June 27, 1972

27,409
STACKABLE INSERT CONTAINER FOR AXIALLY SPACED ENGAGING SURFACES

Herbert J. Wanderer, Elmhurst, Ill., assignor to Illinois Tool Works, Inc., Chicago, Ill.

Original No. 3,232,512, dated Feb. 1, 1966, Ser. No. 366,080, May 8, 1964. Application for reissue Apr. 12, 1967, Ser. No. 637,021
Int. Cl. B65d *21/02, 3/00*
U.S. Cl. 229—1.5 B 14 Claims

Matter enclosed in heavy brackets [ ] appears in the original patent but forms no part of this reissue specification; matter printed in italics indicates the additions made by reissue.

*ABSTRACT OF THE DISCLOSURE*

*The structure herein described comprises a cup or container of thin wall plastic material adapted to be inserted, frictionally retained, and removed from a supporting holder.*

*The cups or containers, when stacked, form a resilient stack or column from which a cup or container may readily be removed by application of the holder to the stack, to be securely but releasably retained in the holder.*

*Also herein disclosed is the holder to be used with the cups or containers.*

*Also herein disclosed are methods and apparatus for thermoforming the cups or containers from sheet plastic material.*

This invention relates in general to plastic articles formed from a web of thermoplastic material. In particular, the present invention relates to a nestable insert cup or container which is adapted to be inserted and retained within a plurality of dissimilarly configured hollow supporting holders.

Disposable insert cups made of paper or paper coated with wax have been sold commercially for quite a number of years by a variety of manufacturers. These cups have been made with a generally conical configuration, and are adapted to be inserted and retained by a suitable supporting holder of hollow configuration. The usage of insert cups with supporting holders is frequently found in soda fountains and other similar establishments where a variety of hot and cold drinks are sold.

In the usual case, the insert cups are placed on a supporting table or other convenient location and kept in inverted stacked relationship. When a drink is ordered, the fountain clerk will grasp a supporting holder, and press it axially over the uppermost cup in the inverted stack. The supporting holder is normally provided with means for retaining a cup therewithin so that when the holder is pressed axially over the uppermost cup, the cup will be gripped and supported by the holder.

Several difficulties have been encountered in using the conically-shaped disposable insert cup. When the cups are stacked in inverted relationship as described above and a supporting holder is positioned in engagement with the uppermost cup, there is no assurance that the stack of cups will respond to the shock of contact so that a single cup will be firmly engaged within the supporting holder. This is primarily due to the inherent weakness of paper cups, and the relatively rigid column of cups that is created when the supporting holder is forced against the uppermost cup. In addition, cups which have been axially squeezed together by a supporting holder tend to wedge together, thus enhancing the difficulty of separating a single cup from the stack. Gravitational forces create substantially the same problems when the cups are positioned within a dispensing apparatus.

Even should a single cup be successfully separated from the stack, the subsequent usage of the same with beverages may cause undesirable tilting or accidental dislodgment of the cup from the supporting holder. On the other hand, it is important that a cup be quickly and easily released from a supporting holder for obvious reasons. In an effort to strike a balance between the retention and release of the cups, supporting holders have been designed or provided with gripping elements which have proved to be successful in releasably retaining the cups in a fairly secure manner. It has been found, however, that while the supporting holders of one manufacturer may function effectively with the cups he makes, they may not work with cups produced by a competitor.

Accordingly, it is an object of the present invention to provide a disposable insert cup which overcomes the heretofore noted disadvantages.

More specifically, it is an object of the present invention to provide a nestable insert cup of the disposable variety which is inherently stronger than prior disposable insert cups, and is not subject to attendant leakage and dislodgment difficulties.

Another object of the present invention is to provide a nestable insert cup which, when stacked together with a similarly configured cup or cups, will create a substantially resilient stack or column of cups, and which will readily facilitate separation of the cups from the stack one at a time.

A still further object of the present invention is to provide a nestable insert cup which can be securely, but releasably retained by a plurality of dissimilarly configured supporting holders.

Other objects and advantages will become apparent from the following description when taken in conjunction with the accompanying drawings wherein:

FIG. 5 is an enlarged fragmentary front elevational view of one form of novel insert cup as used with the supporting holder shown in FIG. 2, the latter being shown in section;

FIG. 6 is an enlarged fragmentary front elevational view of the nestable insert cup shown in FIG. 5 as used in connection with the supporting holder illustrated in FIG. 3, the latter being shown in secion;

FIG. 7 is an enlarged fragmentary sectional view of the cup shown in FIGS. 5–6;

FIG. 7A is a reduced sectional view of another insert cup;

FIG. 8 is an enlarged fragmentary sectional view illustrating the stacking between a pair of juxtaposed containers;

FIG. 9 is an enlarged fragmentary front elevational view, partially in section, of another form of nestable insert cup constructed in accordance with the present invention;

FIG. 9A is a partial view of one form of lip or rim for use with either the cup shown in FIGS. 5–7 or FIG. 9;

FIG. 9B is a partial sectional view of another form of lip or rim for use with either the container shrown in FIGS. 5–7 or FIG. 9;

FIG. 10 is an enlarged fragmentary front elevational iew of the container of cup shown in FIG. 9 as associ- :ed with the holders shown in FIG. 2 and FIGS. 3–4, ıe holders being illustrated in section overlapping one nother;

FIG. 11 is a semi-diagrammatic view of the apparatus sed in constructing the cup of the present invention;

FIGS. 12–15 are partial semi-diagrammatic views milar to FIG. 11, and showing the next succeeding posi- ons of the various apparatus components during the /cling of the device;

FIG. 15A is an enlarged fragmentary sectional view of portion of the apparatus showing the severance of the ›ntainer from the web of thermoplastic materials;

FIG. 15B is an enlarged fragmentary sectional view milar to FIG. 15A, and showing the formation of the ılarged peripheral bead on the upper margin of the ›ntainer; and FIG. 16 is an enlarged fragmentary sectional view : the enlarged peripheral bead of the container.

A general discussion will first be made relative to the sposable insert cup, and will be followed by a discus- on of the method and apparatus for forming the cup. is to be noted that the illustrated forms of the dispos- ›le insert cup are shown in FIGS. 1–10 whereas the ethod and apparatus for forming the cup are shown in IGS. 11–16.

Three forms of disposable insert cups are illustrated ıd identified C1, C2 and C3, each of the cups adapted to : associated with supporting holders identified as H1 ıd H2 as will presently appear. It is to be understood, ›wever, that the disclosed forms of the disposable insert ıps and their supporting holders are to be viewed in ı illustrative sense only, and are not to be taken as the ıly forms contemplated by the present invention.

Figure 1:
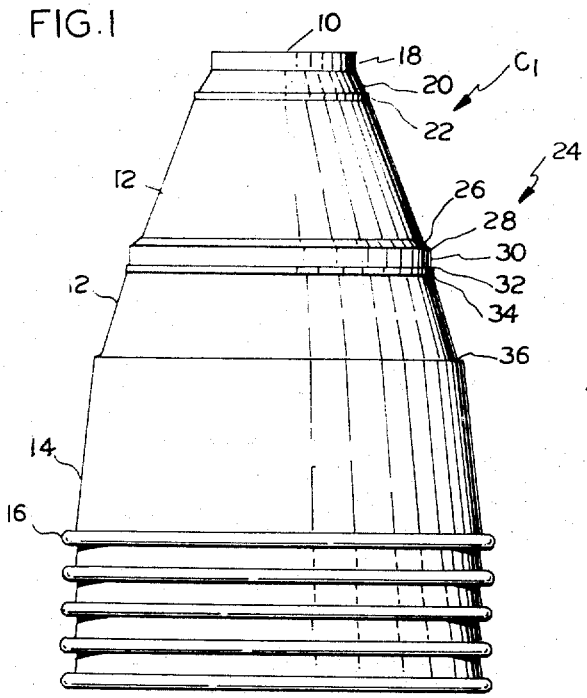
FIG. 1 is a front elevational view of an inverted stack of nestable insert cups constructed in accordance with the present invention.
Figure 2:
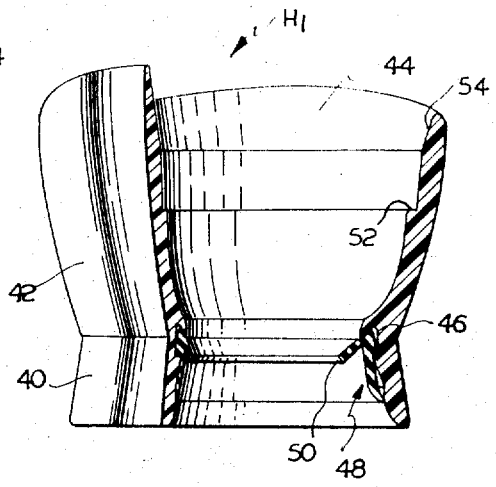
FIG. 2 is a front elevational view, partially in section, of one type of commercial supporting holder.

Referring now in greater particularity to FIGS. 1 and -8, it will be seen that the form of disposable insert ıp identified C1 is provided with a bottom wall 10 and ı upwardly and outwardly tapering side wall 12 extend- g therefrom. The upper extremity of the side wall 2 is integrally joined to an upper body portion 14 which :tends substantially parallel to the cup axis. The outer argin of upper body portion 14 terminates in a radially ·ojecting lip 16 which can have various shapes and con- gurations as will be subsequently discussed.

Figure 3:
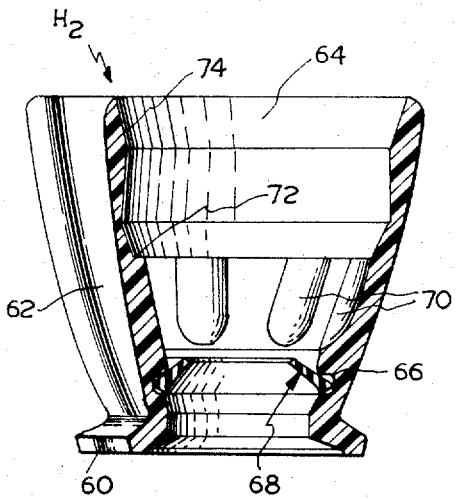
FIG. 3 is a front elevational view, partially in section, of another well known commercial supporting holder.
Figure 4:
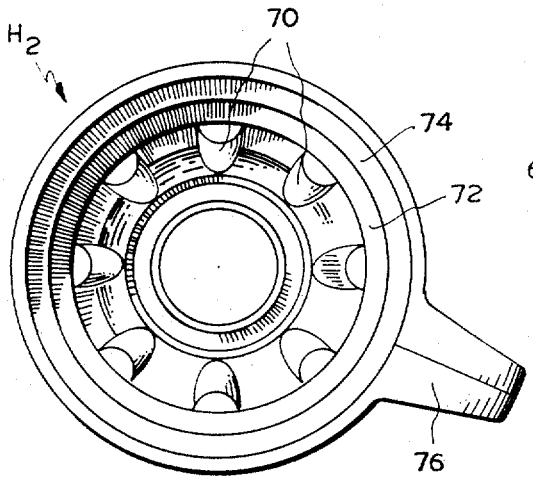
FIG. 4 is a top plan view of the supporting holder shown in FIG. 3.

In most cases, the disposable insert cups are stacked inverted nested relationship on a supporting table, and hollow supporting holder, such as indicated by H1 in IG. 2 and H2 in FIGS. 3 and 4, is adapted to be tele- oped over the uppermost cup in the inverted stack. he disposable insert cups will be positioned and re- asably retained within the hollow supporting holders 1 and H2, and for this purpose, the lower body portion : the cups adjacent the bottom wall 10 is provided with eans for engaging gripping elements associated with the ›llow supporting holders.

There are various types of supporting holders com- ercially available, holders H1 and H2 being merely presentative of two well known forms of such com- ercial holders. Holder H1 has a base 40, a peripherally ıntinuous outer wall 42, and a peripherally continuous ner wall 44. An opening 46 is formed adjacent the wer margin of the supporting holder for receiving the ınular resilient grommet 48. This grommet has a de- :ctable skirt portion 50 for engaging a designated por- ›n of the disposable insert cup as will presently appear. lso formed in the internal wall of the cup is a ledge ', and a tapered mouth area 54. The hollow support- g holder H2 is similarly formed with a base 60, a pe- ›herally continuous outer wall 62, and a peripherally ›ntinuous inner wall 64. As is the case with holder 1, the lower portion of the inner peripheral wall 64 is ovided with an opening or recess, which is identified this example by the reference numeral 66, for receiv- g an annular resilient grommet 68. Pockets 70 are formed in the internal wall 64 of the holder H2, and act as venting means to prevent wedging between the cup and the holder. A ledge 72 and tapered mouth area 74 correspond to the ledge 52 and tapered mouth area 54 of holder H1.

The resilient grommets 48 and 68 of these well known supporting holders are adapted to engage different axial locations of a standard size conically shaped paper cup, but because of the inherent weakness of paper, there is no assurance that the cup will be positively restrained against tilting or accidental dislodgement when the cup is filled with a beverage. Additionally, the taper of a conically shaped cup does not promote a gripping engagement with annular resilient grommets. In such a case, the grommets would be obliged to engage the slanting tapered surface of the cup, and this is partially the reason that the grommets are deflectable for positioning the same in the most effective position so as to compensate for the cup taper.

The plastic disposable insert cup of the present invention overcomes these disadvantages since it will conform to either of the illustrated supporting holders, and at the same time, positively engage the gripping elements of the holders. Stated in a different manner, the plastic disposable insert cup of the present invention is provided with positive gripping and retaining means which will effectively hold the cup within a plurality of dissimilarly configured hollow supporting holders. To accomplish this, cup C1 is provided with first and second engaging surfaces 18, 22 spaced apart by the frusto-conical section 20 adjacent the bottom wall 10 of the cup as best seen in FIGS. 5 and 6. These gripping surfaces are radially outwardly offset, as well as having a reverse taper, with respect to a plane containing the side wall of the container to promote retention of the cup by the annular resilient grommets 48, 68. It is important that these engaging surfaces have an axial location on the cup which creates an engagement with the inner peripheral wall of either resilient grommet when deflected in its final position.

Any number of such gripping surfaces may be provided to correspond with different axial heights of the grommets or with other holder gripping means. It is also to be noted that these gripping surfaces will laterally strengthen the cup in the area subject to the most abuse by the supporting holders.

As has previously been indicated, conically-shaped disposable insert cups tend to wedge together when they are stacked in nested relationship. Thus, when a clerk forces one of the supporting holders over the uppermost cup in a stack, there is no assurance that the supporting holder will remove this particular cup from the stack. Moreover, there is a distinct possibility that more than a single cup will be removed from the stack, and this is obviously undesirable. To prevent this from happening, the present invention provides a stacking means 24 located substantially in the mid portion of the cup side wall 12 for spacing the bottom and side walls of nested cups a predetermined distance from one another, and thereby limit the extent of telescopic association of such cups.

As best seen in FIGS. 5–6 and 8, stacking means 24 is provided with a circumferentially continuous support portion 26, an externally projecting shoulder 28 at the lower extremity of a stacking ring 30, an internal shoulder at the upper extremity of the stacking ring 30, and an overlying circumferential support portion 34. The minimum diameter of the internal shoulder is smaller than the maximum diameter of the externally projecting shoulder so that the internal shoulder of one container will engage the externally projecting shoulder 28 of another container to limit the telescopic association of the containers. This is best illustrated in FIG. 8 of the drawings. The circumferential support portions 26 and 34 of the stacking means aid in not only maintaining each cup stacking ring and its associated shoulders in a predetermined location, but also in strengthening the stacking means as a whole to enhance the lateral strength of the container in its mid portion.

It will be noted in FIGS. 5 and 6 that portions of the stacking means 24 will cooperate with ledges 52, 72 of the holders H1 and H2 respectively to limit insertion of the cup within the supporting holder. The bottom surface of internal shoulder 32 will engage the ledge 52 in the holder H1 whereas the bottom surface of the externally projecting shoulder 28 is designed to engage the ledge 72 in the H2 holder. In certain circumstances, the bottom wall of the cup may extend beyond the lowest extremity of the supporting holder; however, by placing the holder on a flat surface, the cup will be forced upwardly so as to position the appropriate engaging surface in position for engagement by the gripping element. Thus, the cup has a limited relative movement within the holder in both directions, and this facilitates positioning of the engagement surfaces relative to the gripping element of the supporting holders.

While the annular resilient grommets 48, 68 of holders H1 and H2 respectively will sufficiently retain and support the cups within one or the other of the supporting holders, it may be desirable to provide additional supporting points for the cup within the holder. An inspection of FIG. 5 will reveal that the externally projecting shoulder 28 of cup C1 will engage the peripherally continuous inner wall of the supporting holder H1 in the vicinity of the ledge 52. The circumferential protuberance 36 formed by the junction between side wall 12 and upper body portion 14 of cup C1 is also designed to engage the tapered mouth area 54 formed on the internal peripheral wall of the holder H1. As a result, the cup will be supported at several spaced points within the holder H1 to provide several areas of support for the cup C1 with the holder H1.

It will also be observed in FIG. 6 that the cup C1 is engaged by the holder H2 at discrete axially spaced points. In this instance, the second engaging surface 22 is adapted to engage the internal peripheral wall of the holder H2 adjacent the location of the annular resilient grommet 68. Such an engagement with the holder will not interfere with the gripping of the cup by the annular resilient grommet 68, but will only furnish an underbrace for the cup. An additional support for the cup C1 is provided by the engagement of that portion of the side wall 12 positioned above the stacking means 24 with the tapered mouth area 74 of the holder H2. This is in contradistinction to the cup and holder shown in FIG. 5 where the side wall 12 above the stacking means 24 is spaced from the tapered mouth area 54 due to the engagement of the circumferential protuberance 36 with the mouth area.

The construction of cup C2 and its engagement with the hollow supporting holders H1 and H2 is shown in FIGS. 9–10. Cup C2 is similar to cup C1 as indicated by the application of identical reference numerals with the suffix "a" employed to designate like parts. Although a false bottom cup is preferred, it will be noted that the bottom wall of this cup, which is designated by the reference numeral 11, can have a flat planar surface if desired. Tapering upwardly and outwardly from the bottom wall 11 is the side wall 12a, the upper extremity of which is joined to the upper body portion 14a, the latter in turn terminating in the radially projecting lip 16a. The substantial difference between the C2 cup and the C1 cup is in the formation and location of the gripping surfaces formed adjacent the bottom wall 11 of cup C2. The first gripping surface 18a and the frusto-conical section 20a are identical to the cup C1 construction except that the length of the frusto-conical section 20a is shortened. Extending upwardly from the upper extremity of the frusto-conical section 20a is an additional frusto-conical section 21 which has a slightly smaller taper relative to the cup axis than that of section 20a. Intermediate section 21 and that portion of the side wall 12a beneath the stacking means 24a is and engagement surface 23 which is adapted to underlie the deflectable skirt portion of the annular resilient grommet 48 of holder H1. Surface 23 tapers upwardly and outwardly in substantially the same manner as the frusto-conical section 21 and the side wall 12a in comparison to the reverse taper of the first engaging surface 18a in cup C2, and the first and second engaging surfaces 18, 20 respectively in cup C1. This particular construction enables the frusto-conical section 21 to render underlying support to the surface 23 while, at the same time, assuring that the engaging surface 23 will not interfere with the peripherally continuous inner wall portion of the holder H2.

The only significant difference between stacking means 24 and 24a is in the relative height and axial location thereof within the side wall of the respective cups. In the C2 cup, the relative height and location of the stacking means 24a is such as to permit the lower surface of the internal shoulder 32a to engage the ledge 52 of holder H1. When the C2 cup is mounted within the H2 holder, there will be no engagement with the ledge 72 thereof, but the surface 23 will engage the internal wall of such holder without interfering with any of the functions of the gripping element. In both instances, the cup C2 will be engaged by the tapered mouth areas 54 and 74 of the respective holders H1 and H2.

It is possible that a stacking means can be incorporated in the engaging surface area of the disposable insert cup of the present invention. In FIG. 7A of the drawings, cup C3 is shown which is similar to cups C1 and C2 as indicated by the application of identical reference numerals with the suffix "b" employed to designate like parts. In this instance, the junction between the first engaging surface 18b and the frusto-conical section 20b is radially inwardly offset to a greater degree than the cups previously discussed so as to provide an inwardly directed abutment 15. This abutment is radially inwardly offset from the plane containing the container side wall 12b so as to interfere with the outwardly directed abutment 13 of a like container when nested therewithin. Abutment 13 is intermediate first engaging surface 18b and the bottom wall 10b of the container. As a result, the portion designated by numeral 25 will act as a strengthening and rigidifying means rather than as a stacking means as in the previous embodiments. It is important that portion 25 be so related to the outwardly and inwardly directed abutments 13, 15 respectively that the latter will perform the function of stacking a plurality of containers one within the other. Engaging surfaces 18b and 22b will function in the same manner as previously discussed. Since this container design incorporates a gripping and stacking feature adjacent the bottom of the cup, it is obvious that the portion 25 may be eliminated where not desired.

From the foregoing, it will now be appreciated that the disposable insert cup of the present invention provides positive engagement with any one of a plurality of hollow supporting holders while preventing wedging of adjacent cups which are telescoped together to facilitate removal of individual cups from a stack. The lateral strengthening of the cups and the manner in which they are supported within the hollow supporting holders additionally provide improvements over the well known conically-shaped disposable insert cup. It is to be understood that while the insert cups of the present invention are preferably made from a web of plastic material, that other suitable materials may be used, even paper, if constructed in accordance with the present invention.

The novel container shown in FIGS. 1–10 of the drawings is preferably made by the method and apparatus shown in FIGS. 11–15. As has previously been noted, it is important to increase the thickness of the cup rim, and this can be done either by rolling the lips as indicated by reference numeral 17 in FIG. 9a, or by thickening the rim as indicated by reference numeral 9 in FIG. 9b. It is desirable to either roll or increase ıe thickness of the rim not only for strengthening the ɔntainer in the vicinity of its open mouth, but also for liminating any burrs and other undesirable formations hen the container is formed. However, rolling the ms requires additional labor and machines, thus increas- ıg the cost of the disposable insert cup which, for com- etitive necessity, must be made at a relatively low cost. his indicates the desirability of forming a completed cup ı a single operation.

To accomplish this, the method and apparatus shown ı FIGS. 11–15 is provided. The apparatus includes a ie block 80 having a mandrel 82 which cooperates with ıe cavity of mold 100 to form a container of the type reviously described. The die block 80 and mold 100 :e designed to receive a web of suitable thermoplastic ıaterial 130, such as polystyrene, therebetween. This eb is unwound from a suitable supply roll (not shown), ıd fed to the apparatus by suitable feed means (not ıown) which accurately and intermittently supplies the eb to the apparatus. Prior to being positioned between ıe die block and mold of the apparatus, the web is fed ast a temperature controlling means (not shown) which ssures that the web of material is at the correct tem- erature for the subsequent molding operations.

For a specific description of the feeding and tempera- ıre controlling means, reference is made to U.S. Patent umbers 2,891,280 and 2,962,758 which have been as- gned to the same assignee of the present invention. hese patents also show the means for operating the arious elements of the apparatus in the manner to be resently described.

The method and apparatus for forming the containers f the present invention is generally similar to that dis- osed and described in the above mentioned patents. To ıcilitate an understanding of the method and apparatus f the present invention, a brief review of the apparatus ıd its operation as shown in the above mentioned ıtents, as related to the present invention, will now be escribed. Thermoplastic material 130, which has een heated, is fed to and supported between the die ock 80 and mold 100. A clamping means 140 is as- ɔciated with both the die block and female mold for amping the thermoplastic sheet around the opposed andrel and female mold. It has been found that by amping the material in this vicinity, the container which formed by the molding apparatus will have a uniform all thickness which is not only important from the rength standpoint, but also for the appearance of the ɔntainer. Relative movement of the die block and old toward each other will force the clamping means 30 in engagement with the web. Mandrel 82 will en- ıge the web on the continued movement of the die ock and mold toward each other to mechanically pre- aw predetermined areas of the web. After a designated ne period has elapsed, and prior to the complete inter- ting movement of the mandrel and mold, fluid pressure introduced to the ports 81 in the die block to expand e drawn predetermined areas of the web against the old to complete the formation of the container. When ıe container is so formed, it will be severed from the web / complementary cutting means associated with the e block and mold. The lip or rim of the container ill then be formed in a subsequent operation.

The method and apparatus of the present invention is esigned to form an enlarged bead adjacent the open outh of the container without subsequent operations, ıd for this purpose, an annular recess 84 is formed in e die block 80, and is provided with a tapered wall 86 fining the inner peripheral wall portion of the recess. isposed opposite to this recess in the die block is the ɔstanding projection 104 formed at the outer end of the old frame 102. This upstanding projection 104 has a ɔmplementary tapered surface 106 which is adapted to ɔ-act with the tapered wall 86 to clamp and hold the material during the molding operation as will presently appear.

The frame 102 of the mold encloses various container mold portions for forming the engaging surfaces, the stacking means, etc. of the disposable insert cup. The undercut area of the frame directly beneath the upstanding projection 104 has resting thereagainst an upper body mold portion 108. Spaced downwardly from this upper body mold portion 108 is a side wall mold portion 110, a stacking ring mold portion 112, a second side wall mold portion 114, and a gripping surface mold portion 116. These various mold portions are suitably retained in place by the mold support 118 which is secured to the frame 102. A cup ejector 120 is journaled within the bearing 122 which is in turn secured to the mold support 118. The upper surface of this cup ejector 120 is illustrated as being convex in shape for forming the false bottom 10 of the disposable insert cup C1. Although the mold 100 is preferably made into various portions as just described, it is obvious that it also can be made of integral construction.

The above mentioned patents indicate that it is desirable to seal the upper end of the partially formed container prior to the introduction of fluid pressure, and for this purpose, the apparatus disclosed in these patents was provided with container sealing means similar to the recess 84 and upstanding projection 104 of the present invention for sealing the area in which the fluid pressure was to be introduced. The recess and upstanding projection of the present invention will, of course, seal the area in which the fluid pressure is to be introduced; however, it has been found desirable to introduce fluid pressure prior to sealing the drawn predetermined areas of the material. This has been done primarily for the purpose of clamping the partially drawn material against the tapered wall surface 106 of the upstanding projection prior to the complementary interfitting movement of the latter with the recess 84. This sequence of events is shown in FIGS. 12–13, FIG. 12 illustrating the manner in which predetermined areas of the material 130 are mechanically predrawn by the mandrel 82 after being clamped by the clamping means 140, and FIG. 13 indicating the manner in which fluid pressure is introduced through the ports 81 in the die block prior to the interfitting movement of the upstanding projection 104 within the recess 84. By introducing fluid pressure prior to the interfitting movement of the recess 84 and upstanding projection 104, a pinch seal of the material between tapered surfaces 86 and 106 will be assured so as to provide a pneumatic seal as well as prevent slippage of the upper margin of the cup or container within the female mold. An inspection of FIGS. 14–15 will reveal this to be the case.

Additionally, it will be observed as best seen in FIGS. 15 and 15a, that only a substantially vertically extending upper margin of the container will be clamped on opposite sides by the tapered surfaces 86, 106, and this will aid in the formation of the peripherally enlarged bead or rim portion. When the container has been completely formed, it will be severed by the complementary cutting surfaces associated with the recess and upstanding projection at a point laterally spaced from the clamped upper margin of the container. As will be apparent, these cutting surfaces are the ones which are located on the outer peripheral portions of the recess 84 and upstanding projection 104. Cutting surfaces independent of the die block and mold may be provided if desired.

Once the container has been severed from the web of thermoplastic material, the severed free end 132 of the container as shown in FIG. 15a will be stress relieved to permit the same to fold back and self-adhere to itself in the vicinity of the upper margin of the container. The severed free end 132 of the container remains heated since it is not subject to the fluid pressure which expands and thereafter cools the container body. This, together with the fact that the container is clamped by the pinch surfaces 86, 106 at a point laterally spaced from the cutting thereof will cause the severed free end to travel toward the clamped upper margin of the container to create the enlarged peripheral bead shown in FIGS. 15–15b. Thus, the enlarged peripheral bead 134 may be formed by what is termed a "hot-cut snapback" operation. Subsequent withdrawal of the die block and mold from each other serves to release any additional material stresses built up in the material, and cause the enlarged peripheral bead or rim portion to assume the position of the thickened rim portion 19 shown in FIG. 16 of the drawings.

It will be apparent that variations in the angle of the pinch surfaces will permit a variation in the mold stopping point. The relative thickness of the lips with respect to the side wall thickness of the container is determined by the thickness of the initial web of heated thermoplastic material, and the length of the snapback. The snapback of the severed free end of the container whereby it folds back and self-adheres to itself in the vicinity of the upper margin of the container could be made to occur in a confined area for further controlling the final shape of the completed lip or rim portion. A protuberance extending from the bottom wall of the recess in the vicinity of the inner peripheral wall portion thereof would be one way of controlling the final shape of the lip or rim portion. The only limitation imposed would be that the severed free end of the container should be allowed to shift toward the upper margin of the container when its material stresses are relieved.

The operation of the apparatus described hereinabove is as follows: thermoplastic material 130 is intermittently fed past a heating station to the molding apparatus in timed relation with the movement of the die block 80 and female mold 100. Clamping means 140 are then actuated to clamp opposite sides of the material in a circumferential manner surrounding the die block and female mold. Relative shifting movement of the die block and female mold toward each other will cause the mandrel 82 to mechanically predraw predetermined areas of the sheet into the cavity of the mold. Just prior to the pinch seal at the upper margin of the container between tapered surfaces 86, 106, fluid pressure is introduced through the ports 81 in the die block to clamp the material against the upstanding projection. Further relative movement of the die block and mold causes the surfaces 86, 106 to coact, clamping the sheet and providing a pinch seal to enclose the area in which the fluid pressure is introduced on one side of the partially formed container. In this manner, the fluid pressure will expand the predrawn areas of the web into the various container mold portions 108–116 to create the disposable insert cup of the present invention. At approximately the same time that the predrawn areas of the web are expanded against the container mold portions, the complementary cutting surfaces associated with the die block and female mold will sever the container from the web of thermoplastic material at a point laterally spaced from the clamped upper margin of the container to relieve any material stresses in this vicinity. The heated severed free end 132 of the container then snaps back upon itself in the vicinity of the upper margin of the container to form the enlarged peripheral bead portion 134. Withdrawal of the die block and mold from each other will cause the enlarged bead or rim to assume the position shown by lip or rim 19 in FIG. 16. The container is then pushed out of the female mold by the ejector or knockout 120.

While thin walled containers of the disposable insert cup variety may be formed in accordance with the above described method and apparatus, it is to be understood that other container shapes and configurations may be formed with an enlarged peripheral bead portion as desired.

From the foregoing description, it will be apparent that the method and apparatus of the present invention will form a container of superior characteristics with an enlarged peripheral bead or rim portion.

Although specific embodiments have been shown and described, it is with full awareness that many modifications thereof are possible. The invention, is not to be restricted except insofar as is necessitated by the prior art and by the spirit of the appended claims.

I claim:

1. A one piece nestable thin walled container capable of being telescoped into and retained within hollow supporting holders of varying configuration having annular container gripping elements at different axial heights thereof, said container comprising a bottom wall, a peripherally continuous side wall extending generally upwardly and outwardly from said bottom wall and terminating in an open mouth, stacking means formed in said side wall below said open mouth and being radially offset from the plane of the container side wall to limit the extent of telescopic association of a like container therewithin, and means formed in the side wall of said container spaced from said stacking means for positively retaining said container within any one of a plurality of hollow supporting holders and including a plurality of axially spaced engaging surfaces of smaller minimum diameter and axial height than said stacking means, each engaging surface being separated from an adjacent engaging surface by at least one radially inwardly offset, frusto-conical wall section with at least part of said surfaces extending radially outwardly of at least a portion of said intermediate frusto-conical wall section to provide a series of discrete protuberances each capable of engaging a complementary container gripping element associated with said hollow supporting holders without interference from said side wall or each other.

2. A one piece nestable thin walled plastic container adapted to be positioned within any one of a plurality of hollow supporting holders of dissimilar configuration having annular container gripping elements associated therewith at different axial heights thereof, said container comprising a bottom wall, a peripherally continuous side wall extending upwardly and outwardly from said bottom wall and terminating in an open mouth, a rim adjacent the open mouth of said container having an increased thickness relative to the thickness of said side wall to rigidify the container in the vicinity of the open mouth, stacking ring means formed in said side wall generally in the mid-portion thereof and being radially outwardly offset from the plane of the container side wall to limit the extent of telescopic association of a like container while spacing the side walls of said containers a predetermined distance from one another, said stacking ring means including an externally projecting shoulder at its lower extremity and an internal shoulder at its upper extremity having a minimum diameter smaller than the maximum diameter of said external shoulder, the internal shoulder of said stacking ring means adapted to co-act with the complementary external shoulder of a like container to space the bottom walls of said containers a predetermined axial distance from each other, circumferentially spaced portions of said container above and below said stacking ring means adapted to support and laterally strengthen said stacking ring means, and a plurality of spaced circumferentially extending engaging surfaces separate from said stacking ring means and located adjacent the bottom wall of the container each being radially outwardly offset from the container side wall, said engaging surfaces having a maximum diameter and axial height less than the stacking ring means and being separated from each other by at least one radially inwardly offset frusto-conical wall section to provide a series of discrete protruberances for engagement by a complementary annular container gripping element, each engaging surface having a minimum diameter greater than the maximum diameter of an aperture in a respective annular gripping element with which it is to be associated whereby to enable each such griping element to grip and axially restrain the container within its respective supporting holder without interference from said container side wall or other engaging surfaces.

3. The container as defined in claim 2 wherein a portion of the container side wall subjacent the rim of the container is adapted to be engaged by the inner periphery of said hollow supporting holders.

4. The container as defined in claim 2 wherein the external projecting shoulder of said stacking ring means is adapted to rest on an internal ledge formed in one of said holders.

5. The container as defined in claim 2 wherein the external projecting shoulder of said stacking ring means is adapted to rest against the inner peripheral wall of one of said hollow supporting holders.

6. The container as defined in claim 2 wherein the bottom wall of said container is concave axially upwards.

7. The container as set forth in claim 2 wherein said thickened rim is defined by a reverse bend of the side wall adjacent said open mouth to provide a rolled lip.

8. The container as set forth in claim 2 wherein said thickened rim is defined by an enlarged strain relieved peripheral bead portion.

9. The container as defined in claim 2 wherein the circumferential portion of the container below said stacking ring means tapers downwardly and inwardly at a greater angle to the axis of said container than said downwardly tapering portion and being dimensioned to afford initial contact with the upper internal shoulder of a subjacent similarly configured container to provide inward deformation of each container so contacted in the vicinity of said upwardly tapering portion and thereby form a resilient stack of containers.

10. The container as defined in claim 2 wherein the circumferential portion above said stacking ring means includes a first portion extending substantially normal to said stacking ring means and then in a direction generally parallel with said stacking ring means until it merges with said side wall to form an enlarged shelf area for said upper internal shoulder.

*11. A thin wall, throw-away, insert cup for use with cup holder, comprising,*

*a side wall and a bottom wall integrally formed of a thin and flexible thermoplastic material,*

*said side wall having an upper section and a lower section with said upper section being upwardly flared at an angle substantially less than the upward flare of the lower section,*

*a rim provided at the top of said upper side wall section to stiffen the side wall at the top and to provide for comfortable use in contact with the mouth of a user,*

*and means for engaging said cup with a reusable, reinforcing cup holder.*

*12. In combination with the drinking cup of claim 11, a cup holder comprising a generally circular wall surrounding said lower side wall section and providing means for supporting said side wall, and gripping means provided adjacent the bottom of the circular wall and engaging said engaging means.*

*13. In the combination of claim 12, said cup holder further comprising, said gripping means comprising an inwardly extending flange for gripping said engaging means of said cup.*

*14. A drinking cup comprising, a rigid reusable plastic holder having a generally downwardly tapered circular wall,*

*gripping means provided adjacent the bottom of the circular wall for engaging the lower portion of a cup inserted in the holder within the wall,*

*a relatively flexible thermoplastic cup generally frustoconical in shape and releasably engaged by said gripping means and bearing against the upper portion of the circular wall,*

*said flexible thermoplastic cup flaring upwardly at an angle from its bottom to a point above an upper edge of said holder and flaring upwardly at a second angle from that point to its rim, said second angle being smaller than said first angle.*

References Cited

The following references, cited by the Examiner, are of record in the patented file of this patent or the original patent.

UNITED STATES PATENTS

| | | | |
|---|---|---|---|
| D. 199,137 | 9/1964 | Davis | 229—1.5 B X |
| 2,088,181 | 7/1937 | Swift, Jr. | 220—97 C X |
| 3,091,360 | 5/1963 | Edwards | 229—1.5 B X |
| 3,094,240 | 6/1963 | Wanderer | 229—1.5 B X |
| 3,123,273 | 3/1964 | Miller | 229—1.5 B |
| 3,262,626 | 7/1966 | Davis | 229—1.5 B |
| 2,782,616 | 1/1957 | Eron | 229—1.5 X |
| 2,891,280 | 6/1959 | Politis | 264—94 |
| 2,962,758 | 12/1960 | Politis | 264—94 |
| 3,059,810 | 10/1962 | Edwards | 229—1.5 X |
| 3,131,845 | 5/1964 | Sherlock | 229—1.5 |
| 3,139,213 | 6/1964 | Edwards | 229—1.5 X |

DAVIS T. MOORHEAD, Primary Examiner

U.S. Cl. X.R.

220—97 C; D44—9